United States Patent
Wang et al.

(10) Patent No.: US 9,553,495 B2
(45) Date of Patent: Jan. 24, 2017

(54) WOUND CORE, ELECTROMAGNETIC COMPONENT AND MANUFACTURING METHOD THEREFOR, AND ELECTROMAGNETIC EQUIPMENT

(75) Inventors: Zhuonan Wang, Hitachi (JP); Yuji Enomoto, Hitachi (JP); Shigeho Tanigawa, Okegawa (JP)

(73) Assignee: HITACHI METALS, LTD., Tokyo (JP)

( * ) Notice: Subject to any disclaimer, the term of this patent is extended or adjusted under 35 U.S.C. 154(b) by 882 days.

(21) Appl. No.: 13/366,439

(22) Filed: Feb. 6, 2012

(65) Prior Publication Data
US 2012/0248930 A1    Oct. 4, 2012

(30) Foreign Application Priority Data

Mar. 30, 2011 (JP) ................................ 2011-074800

(51) Int. Cl.
| | |
|---|---|
| H02K 1/06 | (2006.01) |
| H01F 41/02 | (2006.01) |
| H01F 27/24 | (2006.01) |
| H01F 27/28 | (2006.01) |
| H02K 15/02 | (2006.01) |
| H01F 3/04 | (2006.01) |
| H02K 1/14 | (2006.01) |

(52) U.S. Cl.
CPC .............. *H02K 15/026* (2013.01); *H01F 3/04* (2013.01); *H02K 1/14* (2013.01); *Y10T 29/49009* (2015.01)

(58) Field of Classification Search
CPC ............. H02K 3/04; H02K 15/04; H01F 3/04; H01F 41/02
USPC ................. 310/207, 208, 216.045, 216.047, 310/216.046; 336/212, 218; 29/605, 606
See application file for complete search history.

(56) References Cited

U.S. PATENT DOCUMENTS

| | | | |
|---|---|---|---|
| 3,032,863 A | | 5/1962 | Steinmayer at al |
| 3,307,132 A | * | 2/1967 | Ellis .............................. 336/211 |
| 3,398,450 A | * | 8/1968 | Subovici ........................ 29/605 |
| 3,629,940 A | * | 12/1971 | Winter ............................ 29/609 |
| 4,809,411 A | * | 3/1989 | Lin et al. ........................ 29/605 |
| 2006/0125593 A1 | * | 6/2006 | Piaskowski ........... H01F 27/085 336/229 |
| 2010/0148611 A1 | | 6/2010 | Wang et al. |

(Continued)

FOREIGN PATENT DOCUMENTS

| | | |
|---|---|---|
| DE | 475064 | 4/1929 |
| DE | 475064 C * | 4/1929 |

(Continued)

OTHER PUBLICATIONS

Japanese Office Action for Appln No. 2011-074800, mailed Apr. 16, 2013, and partial English language translation of Office Action.

*Primary Examiner* — Jose Gonzalez Quinones
(74) *Attorney, Agent, or Firm* — Baker Botts L.L.P.

(57) ABSTRACT

A wound core formed of a magnetic thin band, an electromagnetic component and a manufacturing method therefor and electromagnetic equipment in which iron loss and cost reduction can be achieved are provided. The wound core is a wound core formed by winding a magnetic thin band in the axial direction. A cutout portion is formed from place to place on an end face of the thin band in the axial direction and the cutout portions are arranged in random directions in the direction of the radius of the wound core.

7 Claims, 10 Drawing Sheets

(56) References Cited

U.S. PATENT DOCUMENTS

2011/0025161 A1    2/2011  Ashe et al.
2011/0095628 A1*   4/2011  Enomoto et al. ............... 310/44

FOREIGN PATENT DOCUMENTS

| GB | 1164286 | 9/1965 |
|---|---|---|
| JP | 62-171437 | 7/1987 |
| JP | 62171437 A * | 7/1987 |
| JP | 2000-173831 | 6/2000 |
| JP | 2008-136348 | 6/2008 |
| JP | 2008-148372 | 6/2008 |
| JP | 2008-192893 | 8/2008 |
| JP | 2009-284578 | 12/2009 |
| WO | WO 8101218 A1 * | 4/1981 |

* cited by examiner

WOUND CORE, ELECTROMAGNETIC COMPONENT AND MANUFACTURING METHOD THEREFOR, AND ELECTROMAGNETIC EQUIPMENT

CLAIM OF PRIORITY

The present application claims priority from Japanese Patent application serial no. 2011-074800, filed on Mar. 30, 2011, the content of which is hereby incorporated by reference into this application.

FIELD OF THE INVENTION

The present invention relates to wound cores, electromagnetic components and manufacturing methods therefor, and electromagnetic equipment and in particular to a wound core, an electromagnetic component and a manufacturing method therefor, and electromagnetic equipment in which the iron loss of an entire core can be reduced.

BACKGROUND OF THE INVENTION

Rotary or static electromagnetic equipment, such as motors, generators, and transformers, is required to deliver very high efficiency and output density from a viewpoint of energy saving and weight and cost reduction. From a viewpoint of efficiency enhancement, a thinner magnetic thin band or plate making up a core is better and the thickness of magnetic steel sheets in common use is reduced to 0.5 mm to 0.1 mm. The thickness of amorphous alloy thin bands has been reduced to the order of μm.

When the thickness of a plate or a thin band is reduced, eddy current loss, a type of iron loss, can be reduced. Since an eddy current is less prone to pass through a magnetic material high in electrical resistance, between the magnitude of eddy current and the electrical resistance of a core, there is a relation that loss caused by eddy current is low. The electrical resistance of a thin band (or a plate) of magnetic material relates to the length and thickness thereof. The shorter a thin band is, the higher its resistance is. The thinner a thin band is, the higher its resistance is. For this reason, cores formed by laminating plates of a steel sheet are in widest use to obtain low-iron loss cores.

However, it is difficult to apply such a processing method as stamping or lamination to a thin band. The reason for this is as follows: when the thickness of a thin band is reduced, the number of times of processing for making a core having the same dimensions is increased and this increases the cost thereof. Almost all the thin bands are susceptible to external stress; therefore, after machining, such post treatment as annealing is required. In addition, it is very difficult to easily manufacture them.

To manufacture a wound core from a thin band of amorphous alloy, the technology in Patent Document 1 (JP-A-2008-136348) uses a core formed by winding a continuous amorphous ribbon.

Patent Document 2 (JP-A-2009-284578) discloses that the following are effective to reduce eddy current loss: "an insulator is interposed between ribbon-like amorphous alloy and the same," "a stator core is provided with slits," and "wound ribbon-like amorphous alloy is cut in the radial direction."

Patent Document 3 (JP-A-2000-173831) describes an amorphous core for transformers. The following is the contents of the description: "A predetermined number of thin bands of amorphous magnetic alloy are laminated and the obtained laminates are sequentially cut to required lengths. The thus formed multiple unit core element plates different in length are laminated stepwise in a required number of layers to form a core element group equivalent to one block. These core element groups are butt joined together on a block-by-block basis. At this time, over step lap joining in which the butt joints between core element groups are sequentially shifted and step lap joining are combined. A one turn cut-type wound core is thereby formed."

As mentioned above, many technologies are known with respect to the manufacture of a wound core from a thin band of amorphous alloy.

There are two types of the iron loss of cores, eddy current loss and hysteresis loss. The hysteresis loss can be reduced by annealing. Meanwhile, the eddy current loss relates to such factors as a route through which an eddy current flows and magnetic field strength and the eddy current loss becomes larger with increase in the length of an amorphous ribbon.

For this reason, the amorphous core formed by winding an amorphous ribbon described in Patent Document 1 is easy to be manufactured but it poses a problem of increased eddy current loss. Especially, when it is applied to a high-speed rotary machine, iron loss is significantly increased.

The method for reducing eddy current loss described in Patent Document 2 adopts slit processing so that an eddy current route in a core formed by winding a continuous amorphous ribbon is cut. Therefore, molding for peeling prevention is required. For this reason, the process for forming the core calls for work of winding an amorphous ribbon, annealing and forming work, resin molding work, and slit processing work.

The technique disclosed in Patent Document 2 involves a large number of manufacturing process steps. There is not an easy method for cutting an amorphous core and this increases the manufacturing cost of the core. After an amorphous core is subjected to molding and slit processing, the interior of the core suffers stress and the hysteresis loss is increased. Further, since a hole for a winding jig is left in the center of the core, the utilization ratio of a space is reduced when it is applied to a motor.

Also in the invention disclosed in Patent Document 3, an amorphous alloy laminate may be cut as in that of Patent Document 2. Since the amorphous alloy is very hard, cutting a bock formed of amorphous alloy accelerates wear in jigs and lengthens the cutting time; as a result, the cost becomes very high.

In consideration of the foregoing, it is an object of the invention to provide a wound core formed of a magnetic thin band that enables iron loss and cost reduction, an electromagnetic component and a manufacturing method therefor, and electromagnetic equipment.

SUMMARY OF THE INVENTION

To solve the above problem, the wound core of the invention is formed by winding a magnetic thin band in the axial direction. A cutout portion is formed from place to place in the thin band on an end face in the axial direction and the cutout portions are randomly arranged in the direction of the radius of the wound core.

Each cutout portion is a cut formed in the direction orthogonal to the direction of the length of the thin band.

The end face in the axial direction is formed in a trapezoidal shape.

To solve the above problem, the electromagnetic component of the invention is formed by: winding a magnetic thin band in the axial direction to form a wound core and winding a coil on the circumference of the wound core in the radial direction with an insulator in between. In this electromagnetic component, a cutout portion is formed from place to place in the thin band on an end face of the wound core in the axial direction; and the cutout portions are randomly arranged in the direction of the radius of the core.

Multiple trapezoidal electromagnetic components are formed by arranging them so that their upper bases adjoin to one another and their lower bases adjoin to one another with an insulator in between to form a doughnut-like structure. The structure is molded.

A cylindrically formed wound core of an electromagnetic component is pressed in dies having a trapezoidal cavity.

A cylindrically formed would core of an electromagnetic component is pressed in dies having a trapezoidal cavity and is annealed together with the dies.

To solve the above problem, the manufacturing method of the invention includes: winding a magnetic thin band in the axial direction to form a wound core in which a cutout portion is formed from place to place in the thin band on an end face in the axial direction and the cutout portions are randomly arranged in the radial direction; winding a coil in the direction of the circumference thereof to form an electromagnetic component; and pressing a cylindrically formed wound core of a electromagnetic component in dies having a trapezoidal cavity and then annealing it together with the dies.

To solve the above problem, the electromagnetic equipment of the invention is formed by: winding a magnetic thin band in the axial direction to form a wound core in which a cutout portion is formed from place to place in the thin band on an end face in the axial direction and the cutout portions are randomly arranged in the radial direction; winding a coil in the direction of the circumference thereof to form a slot; forming the end face in the axial direction of each slot in a trapezoidal shape; arranging the multiple trapezoidal slots so that their upper bases adjoin to one another and their lower bases adjoin to one another with an insulator in between to from them in a doughnut shape; molding them to form a stator; rotatably holding a rotating shaft in the center of the stator; and opposing a rotor fixed on the rotating shaft and having a magnet to a plane of the stator orthogonal to the rotating shaft.

The invention obviates the necessity for cutting a core and makes it possible to reduce a manufacturing cost. With respect to the iron loss of the core, eddy current loss and hysteresis loss can be reduced and thus the iron loss is reduced. Though wound cores are generally cylindrical, the invention provides a wound core that can be formed in a different shape. This makes it possible to obtain a desired core applicable to a rotary machine and a static machine.

DETAILED DESCRIPTION OF THE PREFERRED EMBODIMENTS

Hereafter, description will be given to a core of the invention and embodiments of electromagnetic equipment using it with reference to the drawings.

First Embodiment

In the description of First embodiment, a cylindrical wound core will be taken as an example of the core.

Figure 1:
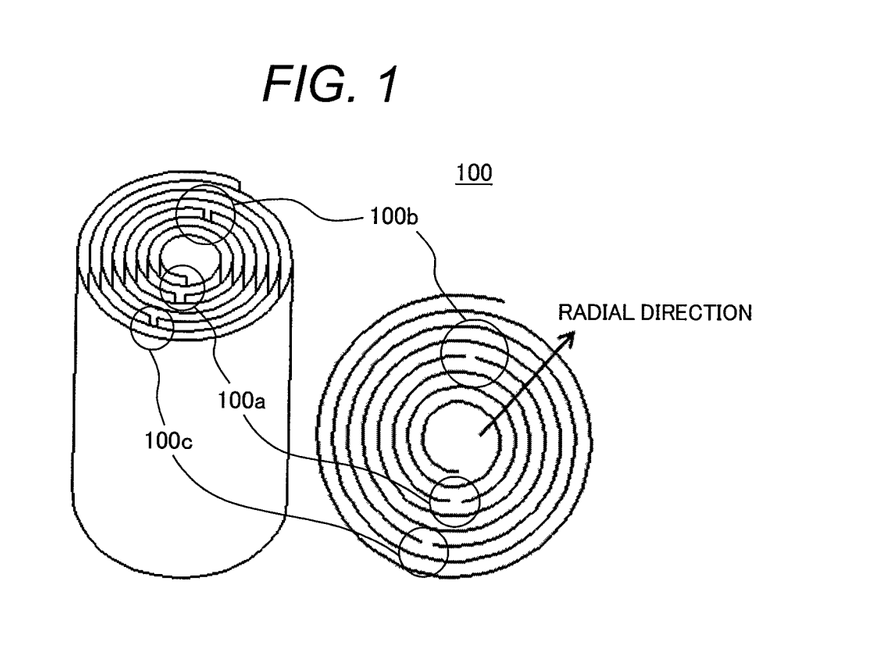
FIG. 1 is a drawing illustrating a cylindrical wound core as an example of a core of the invention.

FIG. 1 is a perspective view (left of FIG. 1) of the cylindrical wound core in First embodiment and a front view (right of FIG. 1) thereof. As illustrated in FIG. 1, the spiral cylindrical core 100 in First embodiment is not continuous from the start of winding to the end of winding and is cut in multiple places. The cut portions (100a, 100b, 100c) are not located in an identical position in the radial direction but they are randomly arranged.

Figure 2:
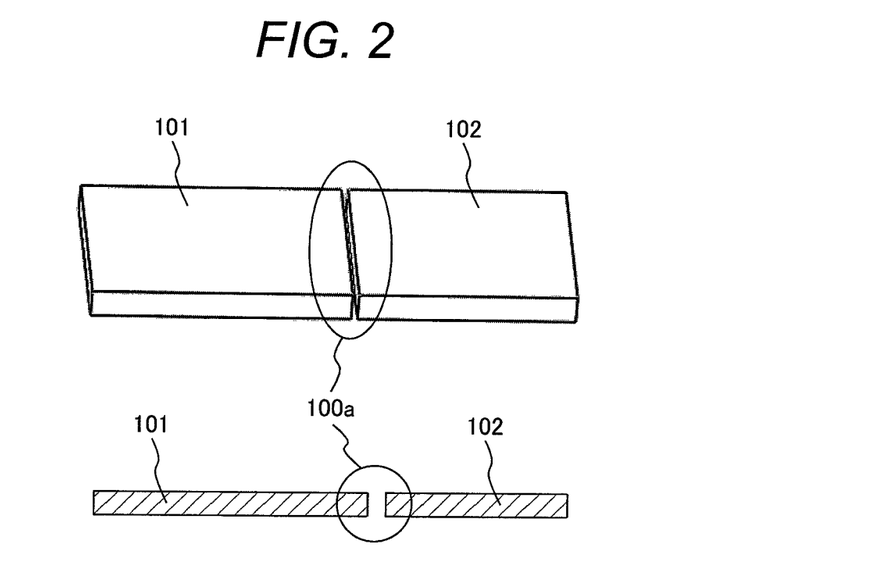
FIG. 2 is a drawing explaining the processing of joining the areas before and after a cut portion.
Figure 3:
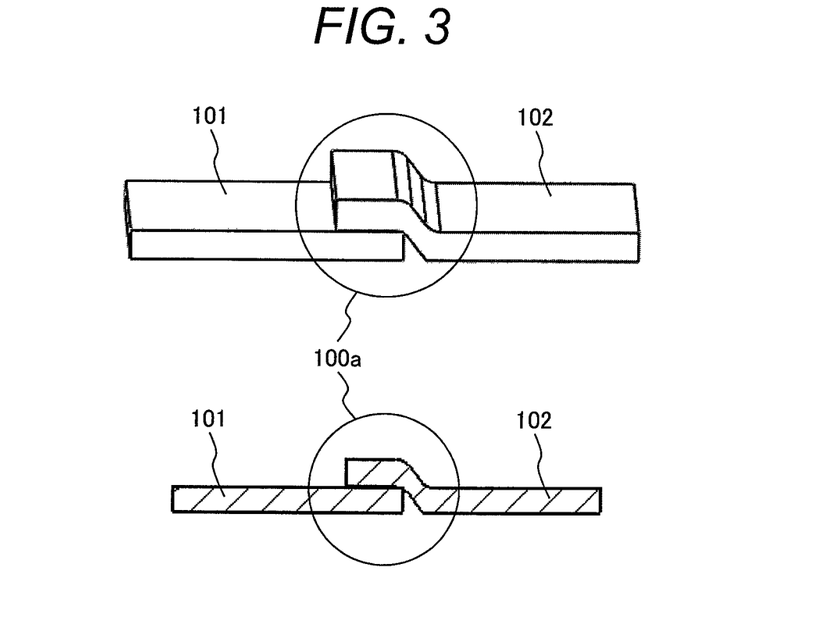
FIG. 3 is a drawing explaining the processing of joining the areas before and after a cut portion.
Figure 4:
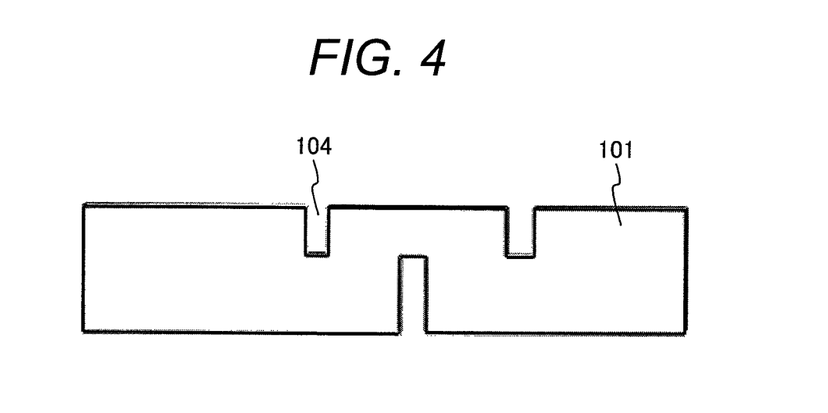
FIG. 4 is a drawing illustrating an example in which cutout portions are provided in place of cutting.

To join the areas before and after each cut portion (100a, 100b, 100c), any of the methods illustrated in FIG. 2 to FIG. 4 can be used. In the example of FIG. 2, at the cut portion 100a, the inner radius-side magnetic member (for example, magnetic thin band 101) and the outer radius-side magnetic member (for example, magnetic thin band 102) adjoin to each other. Thus a non-overlap method is used. Randomly arranging the cut portions (100a, 100b, 100c) makes it possible to prevent a protrusion in only one place in the core obtained by non-overlap joining.

In case of non-overlap method, the distance between the inner radius-side magnetic member (for example, magnetic thin band 101) and the outer radius-side magnetic member (for example, magnetic thin band 102) is not critical. Cut portions may be so positioned that they are away from each other by a half turn or so. An example of this will be described later with reference to FIG. 6.

In the example of FIG. 3, at the cut portion 100a, the inner radius-side magnetic member (for example, magnetic thin band 101) and the outer radius-side magnetic member (for example, magnetic thin band 102) overlap with each other. Thus an overlap method is used. In a core obtained by overlap joining, the following takes place if cuts are concentrated in one place in the radial direction: when it is applied to a rotary machine, the magnetic reluctance is increased and leakage flux is produced. In this case, the leakage flux can be reduced by randomly arranging the cut areas in the radial direction. In the wound core, the cut thin bands need not be identical in length. Thin bands different in length may be combined. A wound core may be formed of completely separated thin bands.

In the examples in FIG. 2 and FIG. 3, a ribbon-like magnetic member is cut in the direction orthogonal to the direction of length in appropriate places. In other examples of the invention, a magnetic member need not be cut into two (completely cut). As illustrated in FIG. 4, a core may be formed of a magnetic thin bands provided with cutout portions 104. That is, a ribbon-like magnetic member may be provided in appropriate places at an end in the direction of length with a cutout portion 104.

Cutting in FIG. 2 to FIG. 4 is all implemented by providing a cutout portion 104 in appropriate places at an end of the direction of the length of a ribbon-like magnetic member. The cuts in the examples in FIG. 2 and FIG. 3 are obtained as the result of each cutout portion 104 being extended to the other end.

Figure 5:
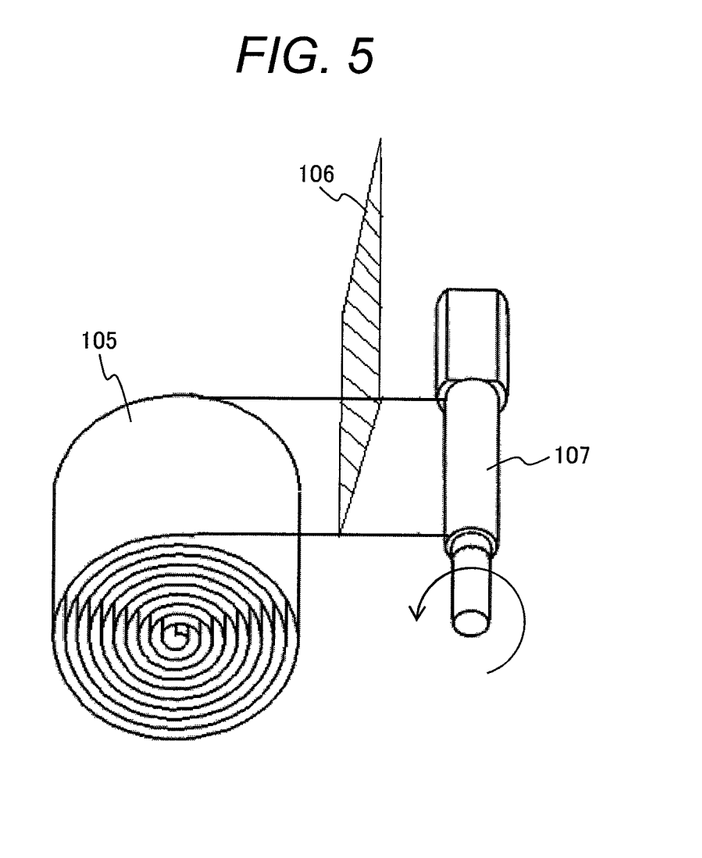
FIG. 5 is a drawing illustrating an example of a manufacturing method for a cylindrical wound core.

FIG. 5 illustrates an example of a manufacturing method for a cylindrical wound core in this embodiment. First, a long magnetic thin band raw material 105 is prepared. This is wound in a drum shape. Meanwhile, a winder (not shown) is installed and one end (winding start end) of the long magnetic thin band raw material 105 is fixed on the bobbin 107 of the winder. The material is wound by a predetermined length by the winder and cut by a cutter 106. The end (winding end end) of the cut magnetic thin band is fastened to the core wound on the bobbin 107 by a bonding means such as adhesive or welding. The reason why the core wound on the bobbin 107 is fastened by the bonding means is to prevent unwinding and various temporarily fastening means can be applied for this purpose.

Next, the winding start end of the magnetic thin band raw material 105 is fastened again to the wound core in a predetermined position. The raw material is wound again to a predetermined length and cut and the winding end end is fastened. The above step is repeated several times until a required outside diameter is obtained and thus a wound core in a desired size can be obtained. When the winding start end of the magnetic thin band raw material 105 is fastened again to the wound core in a predetermined potion, positioning is so carried out that the cut portions (100a, 100b, 100c) are located in an identical place in the radial direction.

Figure 6:
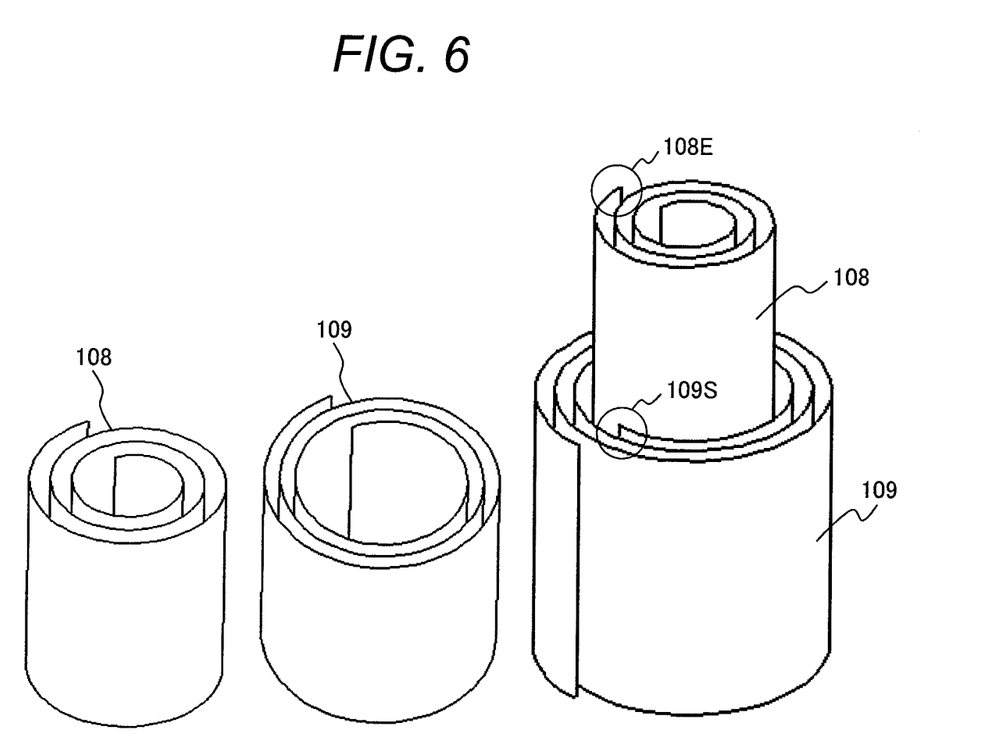
FIG. 6 is a drawing illustrating another example of a manufacturing method for a cylindrical wound core.

FIG. 6 illustrates another example of the manufacturing method for the cylindrical wound core in this embodiment. In this example, first, a wound core 108 is manufactured from a magnetic thin band with a predetermined length. Similarly, a wound core 109 is manufactured from a magnetic thin band. The outside diameter of the wound core 108 is set to a value equal to or larger than the inside diameter of the wound core 109. The separately formed wound cores are so combined that the wound core with the smaller diameter is placed in the wound core with the larger diameter to form a wound core. This manufacturing method is characterized in that the inside diameter of the wound core with the larger diameter is equal to or larger than the outside diameter of the wound core with the smaller diameter. A bonding means may be provided between the wound cores depending on the use of the wound core.

In the left and center sketches in FIG. 6, the wound cores 108, 109 are both so placed that they are wound clockwise. In the right sketch in the drawing illustrating them as are combined, the wound core 109 is so placed that it is wound counterclockwise. In this invention, cut portions only have to exist and the wound cores 108, 109 may be wound clockwise or counterclockwise. In the right sketch in the drawing illustrating the wound cores as are combined, the winding start position 109S of the wound core 109 with the larger diameter and the winding end position 108E of the wound core 108 with the smaller diameter are farther away from each other than in FIG. 2. In this invention, whether the distance between them is long or short is not important.

The manufacturing method for the core is not limited to the foregoing and various methods can be used as long as they have the characteristics of the core of the invention. In the above description, the cross-sectional shape of the core is circular but this is not indispensable. The core can have any desired shape, such as oblong, trapezoid, and triangle with rounded corners.

In this invention, it is indispensable that cut portions are provided in random positions in the direction of winding. The type of a magnetic thin band forming a core is not limited to one and a single core may be formed of multiple types of magnetic thin bands.

It is desirable that the wound core manufactured according to this embodiment should be annealed to some extent. Annealing makes it possible to relieve stress accumulated in the wound core and thus reduce hysteresis loss.

Figure 7:
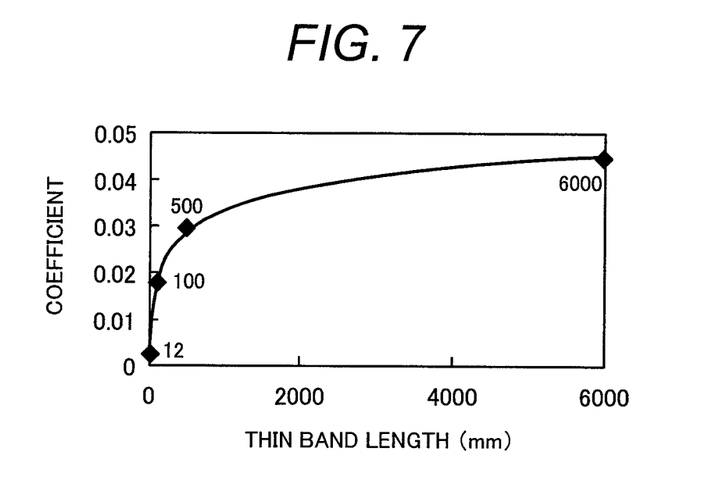
FIG. 7 is a graph indicating actual measurement values with respect to the relation between the thin band length of a wound core and eddy current loss coefficient.

According to this embodiment:
(1) A low-iron loss wound core can be provided. When the wound core is applied to a rotary machine, the loop (circuit) through which an eddy current flows can be cut at the cut portions and thus eddy current loss can be reduced. FIG. 7 indicates actual measurement values with respect to the relation between the thin band length (horizontal axis) of a wound core formed by cutting a ribbon-like thin band of amorphous alloy and eddy current loss coefficient (vertical axis). It can be seen from the graph that the eddy current loss is reduced as the length of the thin band forming the wound core is reduced. In the cases of FIG. 1, FIG. 2, FIG. 3, and FIG. 6, the length of the thin band is the distance between cut surfaces in the direction of length; and in the case of FIG. 4, it is equivalent to the distance between cutout portions.
(2) A core excellent in magnetic characteristic can be provided. In this embodiment, the cut portions in the wound core are not concentrated in one place and thus leakage flux can be reduced.
(3) A low-cost wound core can be provided. A thin band is not cut into blocks and thus the processing cost can be reduced.
(4) A wound core easy to manufacture can be provided. According to this embodiment, a material is not cut into wound cores and this obviates the necessity for measures against peeling, such as bonding thin band layers together and molding. Adhesive is unnecessary between layers and the packing factor of the core can be enhanced.

Second Embodiment

Figure 8:
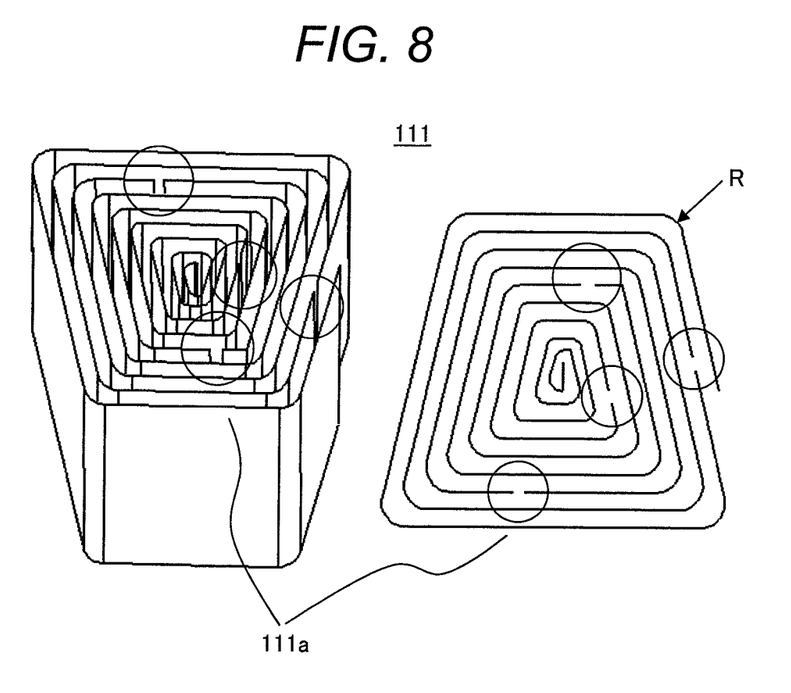
FIG. 8 is a drawing illustrating a trapezoidal wound core as an example of a core of the invention.

In relation to Second embodiment, description will be given to the manufacture of a trapezoidal wound core with reference to FIG. 8 to FIG. 11. FIG. 8 is a perspective view of the trapezoidal wound core in Second embodiment and a front view thereof. The comparison of the trapezoidal wound core in FIG. 8 with the cylindrical wound core in FIG. 1 reveals the following: they are different only in that the cross-sectional shape is trapezoidal or circuit and they are identical in that cut areas 111a are provided in arbitrary directions.

Figure 9:
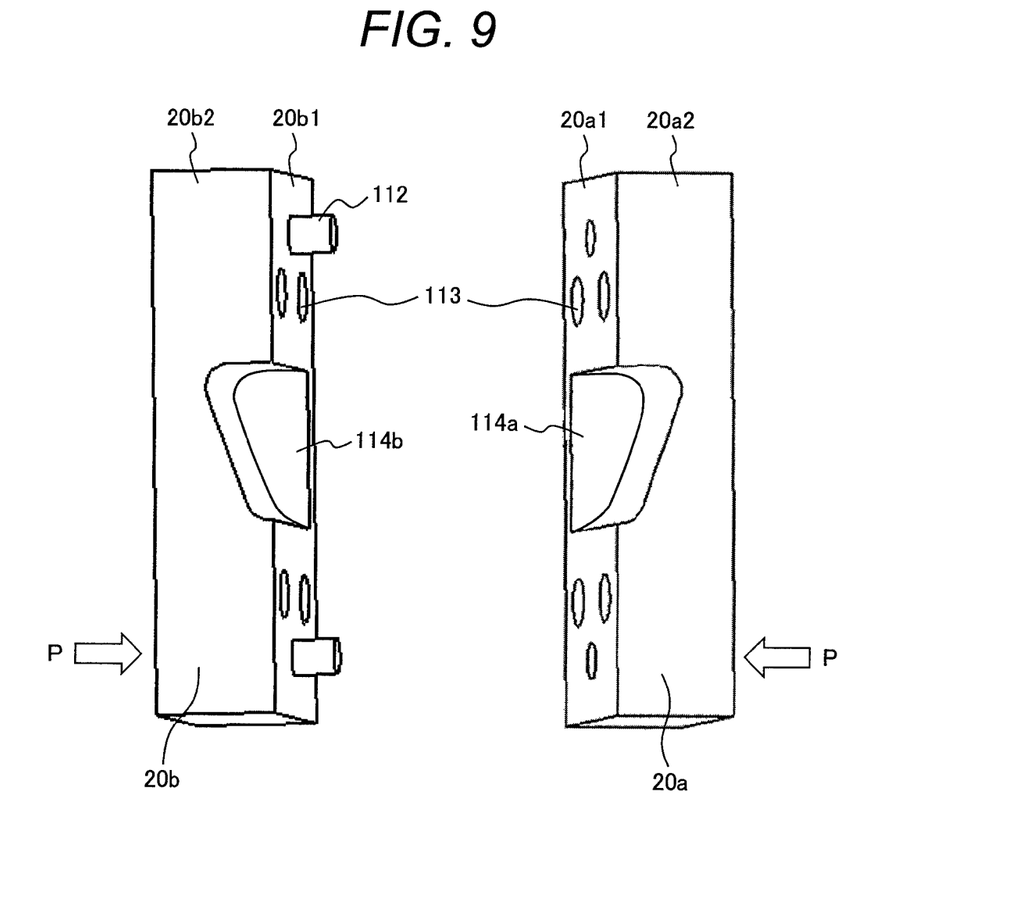
FIG. 9 is a drawing illustrating an example of a jig for forming a trapezoidal wound core.

FIG. 9 illustrates an example of a jig for forming the trapezoidal wound core in FIG. 8. The forming jig is made up of two dies 20a, 20b. FIG. 9 shows the two dies 20a, 20b in such positions that their opposite surfaces 20a1, 20b1 are visible for helping understanding. The opposite surfaces 20a1, 20b1 are provided with core placement cavities 114a, 114b, positioning pins 112, and positioning holes 113. The two dies 20a, 20b are moved by external force P and the positioning pins 112 and the positioning holes 113 are fit together. As a result, the opposite surfaces 20a1, 20b1 are mated with each other.

Figure 10:
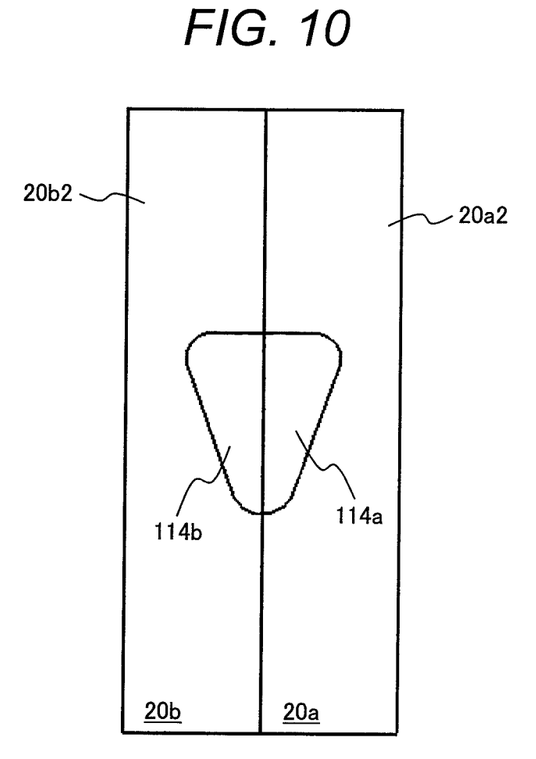
FIG. 10 is a drawing illustrating a side surface obtained when two dies are fit and mated together.

FIG. 10 illustrates the side surfaces 20a2, 20b2 obtained when the two dies 20a, 20b are mated with each other by fitting. It can be seen from the drawing that a trapezoidal space is formed by the core placement cavities 114a, 114b respectively formed in the two dies 20a, 20b when they are mated with each other.

As can be imagined from the above description, such a trapezoidal wound core 111 as in FIG. 8 can be obtained by taking the following procedure: in the state, illustrated in FIG. 9, before the fitting is started, such one cylindrical wound core 100 as illustrated in FIG. 1 is placed in the core placement cavities 114a, 114b so that the winding surface comes to the near side; and thereafter, the opposite surfaces 20a1, 20b1 are mated with each other by external force P.

Figure 11:
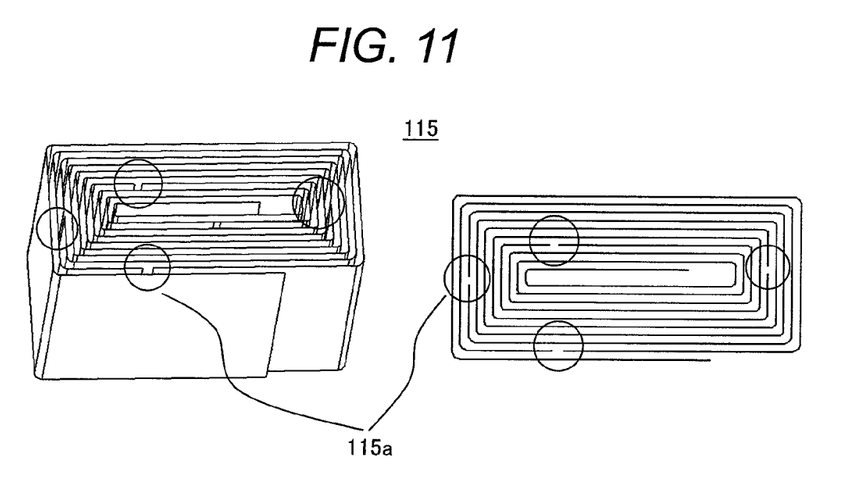
FIG. 11 is a drawing illustrating an oblong as an example of the shape of a wound core.

A wound core having a cross-sectional shape other than trapezoidal can be obtained by adding a twist to the shape of the core placement space formed in the dies when they are mated with each other. FIG. 11 illustrates an oblong as an example of the shape of the wound core. Also in this case, the cut portions are formed in arbitrary directions on the cross section.

The wound core in Second embodiment is common to the cylindrical wound core in First embodiment in many respects. Hereafter, therefore, the detailed description of points in common will be omitted and description will be given mainly to a difference.

In this embodiment, a cylindrical core formed according to First embodiment is used to form a core having a different shape. First, description will be given to a forming jig. To enhance forming accuracy, the forming jig body (die) is made up of jigs separated into at least two. A space (core placement cavities 114a, 114b) having a desired core shape is provided in the center of the forming jig. To accurately align the positions of the jigs during forming, the jigs are provided with aligning means, such as positioning pins. A material high in strength is desirable for the material of the forming jig.

The manufacturing method for the wound core according to this embodiment is characterized in that:
(a) A cylindrical core is formed according to First embodiment.
(b) The formed cylindrical core is placed in position in the forming jig and the dies 20a, 20b are aligned with each other and force is externally applied to mate the dies 20a, 20b with each other as illustrated in FIG. 10. The external force includes force obtained by using screw holes 113 provided in the dies 20a, 20b to tighten a screw and force, pressing force from a press machine.
(c) It is desirable that the core formed by applying external force should be kept housed in the dies 20a, 20b and be annealed to some extent in an annealing furnace. This makes it possible to relieve stress accumulated due to external stress and enhance the magnetic characteristic of the core. As the result of annealing, the core can maintain the core shape without any special fixing means after it is taken out of the dies 20a, 20b. The trapezoidal core illustrated in FIG. 8 can be obtained by the above steps.

The trapezoidal wound core 111 in FIG. 8 formed by the above-mentioned method is characterized in that it is provided with an angle R. The hole in the center of the core is characterized in that it is smaller than the wound core before it is deformed.

In the description of the above method, a trapezoidal core has been taken as an example. Cores in other shapes can also be formed by the same method. FIG. 11 illustrates an example of an oblong wound core According to this embodiment, the following effects are brought about:
(1) A wound core high in the degree of freedom of forming can be provided. Not only a cylindrical wound core but also wound cores having various shapes can be formed depending on the shape of the dies 20a, 20b.
(2) A low-iron loss wound core can be provided. Since the magnetic thin band forming the wound core is cut, the eddy current loss can be reduced. Since the wound core is annealed, the hysteresis loss can be reduced. Therefore, the iron loss can be reduced.
(3) A wound core high in packing factor can be provided. Since adhesive, resin, or the like is not provided between layers of a magnetic thin band, the packing factor of the core can be enhanced. When the shape of the core is re-formed by external force through the dies 20a, 20b, the cut thin bands can move into a clearance in the core. Therefore, the clearances in the core can be eliminated and the packing factor is enhanced.
(4) The magnetic characteristic of the core can be enhanced. According to this embodiment, a hole that would be otherwise left in the center of the core can be eliminated and leakage flux can be reduced. Therefore, the magnetic characteristic of the core can be enhanced.

Third Embodiment

In relation to this embodiment, description will be given to an example of a rotary machine to which a trapezoidal wound core obtained according to Second embodiment is applied with reference to FIGS. 12 to 15. In the description of this embodiment, an axial gap motor will be taken as an example. However, this embodiment is also applicable to other types of motors, for example, radial gap motors, toroidal motors, and the like.

Figure 12:
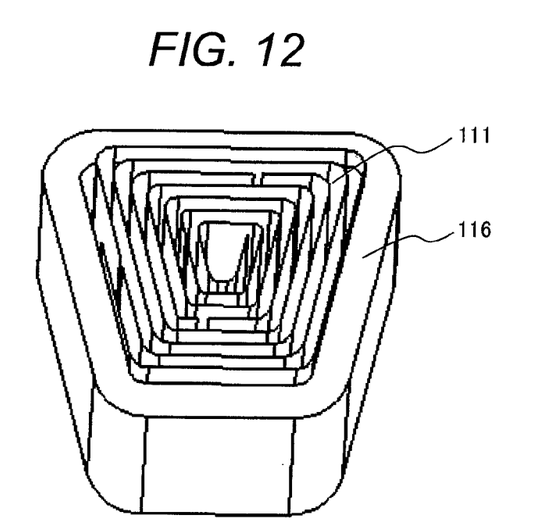
FIG. 12 is a drawing illustrating one slot of the stator of a motor.

FIG. 12 illustrates one slot of the stator of a motor. In this example, a coil 116 is placed around a trapezoidal wound core 111 formed of cut thin bands according to Second embodiment and the assembly is taken as one slot of the stator. The trapezoidal wound core 111 and the coil 116 are insulated from each other. In the above description, the cross-sectional shape of the core is trapezoidal but this is not indispensable. The core can be formed in any desired shape, such as a circle, an oblong, a triangle with rounded corners, and the like. It is desirable that a core having corners should be provided with an angle R to prevent the breakage of the insulating layer of the coil provided therearound.

Figure 13:
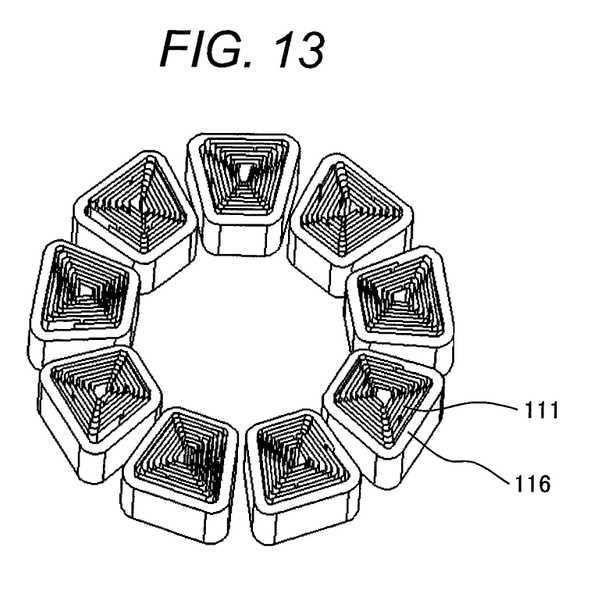
FIG. 13 is a drawing illustrating a nine-slot stator.

FIG. 13 illustrates a nine-slot stator. The cores 111 and the coils 116 are arranged at equal intervals in the circumferential direction. An insulator (not shown) is interposed between slots. The entire stator is fixed with molding resin. The stator in FIG. 13 is formed by: arranging multiple trapezoidal slots, each of which is the trapezoidal slot in FIG. 12, so that their upper bases adjoin to one another and their lower bases adjoin to one another with an insulator in between to form a doughnut-like structure; and molding the structure.

The one slot of the stator of the motor in FIG. 12 and the stator having the multiple slots in FIG. 13 are both intermediate members as viewed from the end product. In this specification, therefore, they will be collectively handled as electromagnetic components.

Figure 14:
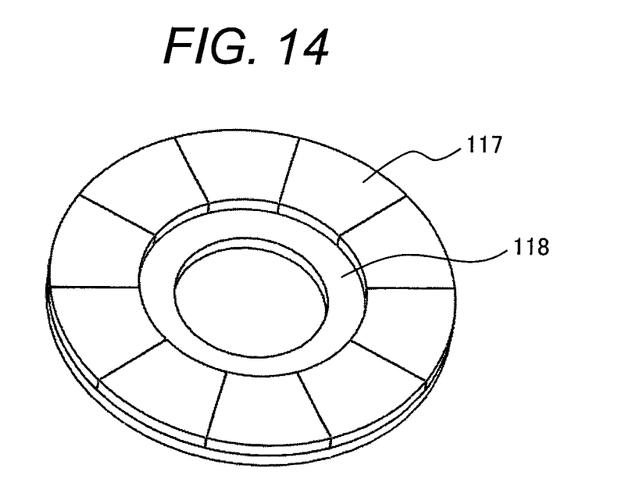
FIG. 14 is a drawing illustrating a 10-pole rotor.

FIG. 14 illustrates a 10-pole rotor. Ten magnets 117 are placed at equal intervals on the surface of a rotor yoke 118. Any other magnetic material may be substituted for the magnet 117 and an electromagnet is also acceptable depending on circumstances. The shape of the magnet 117 can be any appropriate shape. The rotor yoke 118 is constructed of an iron-based material or any other magnetic material. To reduce the iron loss, mainly the eddy current loss, of the rotor yoke, it is desirable to use a toroidal wound core formed of the thin band described in relation to First embodiment.

Figure 15:
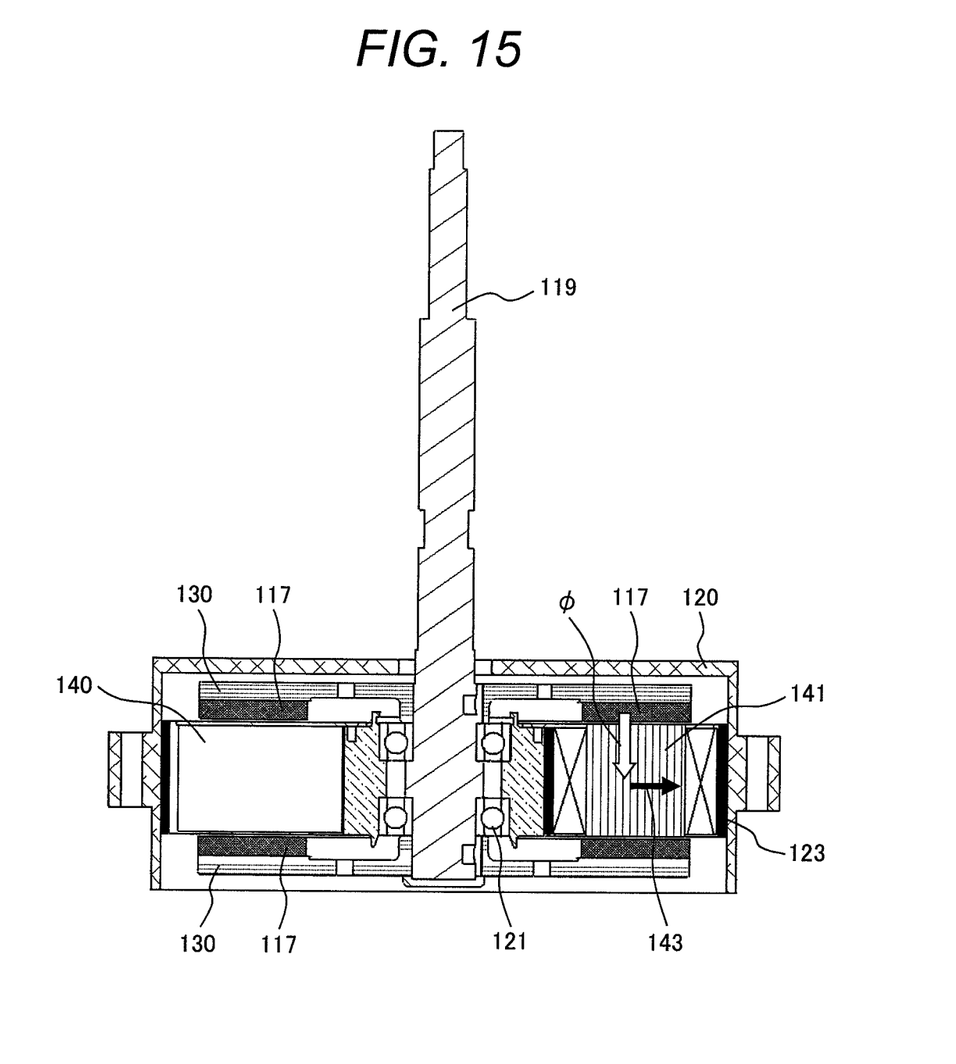
FIG. 15 is a drawing illustrating a two-rotor, one-stator axial gap motor.

FIG. 15 illustrates a two-rotor, one-stator axial gap motor. The axial gap motor is provided in its motor housing 120 with two sets of the rotors 130 illustrated in FIG. 14. It is so structured that the stator 140 illustrated in FIG. 13 is sandwiched between the rotors 130 with an air gap in between. The rotors 130 and the shaft 119 are fixed together and the stator 140 is fixed in the housing 120. The shaft 119 is rotatably held on the stator 140 through a bearing 121. The rotor yoke is so structured as to hold the inner ring of the bearing.

The stator 140 is configured as illustrated in FIG. 13 and placed in the position shown in FIG. 15. That is, each slot making up the nine-slot stator 140 is in the shape shown in FIG. 12. The magnets 117 of the rotors 130 face the upper and lower surfaces of each wound core 111 in FIG. 12 with an air gap in between. The stator 140 in FIG. 13 is molded with resin 123.

For this reason, the magnets 117 on the rotor 130 side and the stator core 141 on the stator 140 side are placed opposite to each other. As a result, the magnetic flux Φ produced from the rotors 130 is positioned perpendicularly to the direction 143 of lamination of the wound cores 111 of the stator core 141 and an eddy current does not flow in the plane of the magnetic thin bands.

As a result, the following can be implemented with respect to eddy current flowing in the plane of each magnetic thin band having a thickness: the eddy current loop can be shortened by using a wound core provided with cut areas and thus the iron loss of the entire core can be reduced.

What is claimed is:

1. A wound core formed by winding a magnetic thin band in the axial direction,
    wherein one or more cutout portions are formed from place to place on an end face of the thin band in the axial direction and the cutout portions are arranged in random directions in the direction of the radius of the wound core, wherein the cutout portions separate the magnetic thin band into a plurality of partitioned magnetic thin bands wherein each of the partitioned magnetic thin bands are of a sufficient length to traverse at least one complete rotation in the radial direction around a center of the wound core,
    wherein the wound core having a different shape from a cylindrical shape wound core is obtained by pressing the cylindrical shape wound core placed in core placement cavities respectively formed in dies and by annealing the wound core being kept housed in the dies, and
    wherein the length of the thin band is limited in order to reduce the eddy current loss of the wound core.

2. The wound core according to claim 1,
    wherein each of the one or more cutout portions is formed in a direction orthogonal to the direction of the length of the thin band.

3. The wound core according to claim 2,
    wherein the end face in the axial direction is formed in a trapezoidal shape.

4. An electromagnetic component formed by winding a magnetic thin band in the axial direction to form a wound core and winding a coil on the circumference of the wound core in the radial direction with an insulator in between,
    wherein one or more cutout portions are formed from place to place on an end face of the thin band in the direction of the axis of the wound core and the cutout portions are arranged in random directions in the direction of the radius of the core, wherein the cutout portions separate the magnetic thin band into a plurality of partitioned magnetic thin bands wherein each of the partitioned magnetic thin bands are of a sufficient length to traverse at least one complete rotation in the radial direction around a center of the wound core,
    wherein the electromagnetic component is formed by pressing the wound core formed in a cylindrical shape between dies having a trapezoidal space and annealing the wound core together with dies, and
    wherein the length of the thin band is limited in order to reduce the eddy current loss of the wound core.

5. The electromagnetic component according to claim 4,
    wherein each of the one or more cutout portions is formed in a direction orthogonal to the direction of the length of the thin band.

6. An electromagnetic component formed by arranging the dies having a trapezoidal space according to claim 5 so that upper bases thereof adjoin to one another and lower bases thereof adjoin to one another with an insulator in between to form a doughnut-like structure and molding the doughnut-like structure.

7. An electromagnetic apparatus configured by:
    winding a magnetic thin band in the axial direction to form a wound core in which one or more cutout portions are formed from place to place on an end face of the thin band in the axial direction and the cutout portions are arranged in random directions in the radial direction, wherein the cutout portions separate the magnetic thin band into a plurality of partitioned magnetic thin bands wherein each of the partitioned magnetic thin bands are of a sufficient length to traverse at least one complete rotation in the radial direction around a center of the wound core;
    winding a coil in the direction of the circumference of the wound core to obtain a slot;
    forming the end face of the slot in the axial direction in a trapezoidal shape;
    arranging a plurality of trapezoidal slots created by forming the end face so that upper bases thereof adjoin to one another and lower bases thereof adjoin to one another with an insulator in between to form a doughnut shape;
    molding the doughnut to form a stator;
    rotatably holding a rotating shaft in the center of the stator; and
    opposing a rotor fixed on the rotating shaft and having magnets to a plane of the stator orthogonal to the rotating shaft wherein the wound core having the end face in the axial direction formed in the trapezoidal shape is formed by pressing the wound core formed in a cylindrical shape between dies having a trapezoidal space and annealing the wound core together with dies, and wherein the length of the thin band is limited in order to reduce the eddy current loss of the wound core.

\* \* \* \* \*